(12) United States Patent
Zarick et al.

(10) Patent No.: US 10,785,613 B1
(45) Date of Patent: *Sep. 22, 2020

(54) SMS CHECK IN AND CHECK OUT

(71) Applicant: West Corporation, Omaha, NE (US)

(72) Inventors: Joseph E. Zarick, Columbus, OH (US); Darren S. Thraen, Columbus, OH (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,120

(22) Filed: Jun. 11, 2019

Related U.S. Application Data

(63) Continuation of application No. 15/949,235, filed on Apr. 10, 2018, now Pat. No. 10,321,281, which is a continuation of application No. 14/829,917, filed on Aug. 19, 2015, now Pat. No. 9,942,734.

(51) Int. Cl.
| | |
|---|---|
| *H04W 4/14* | (2009.01) |
| *H04W 4/12* | (2009.01) |
| *H04W 4/02* | (2018.01) |
| *H04W 12/06* | (2009.01) |
| *H04L 29/06* | (2006.01) |
| *H04W 12/00* | (2009.01) |

(52) U.S. Cl.
CPC ............ *H04W 4/14* (2013.01); *H04W 4/025* (2013.01); *H04W 12/06* (2013.01); *H04L 63/107* (2013.01); *H04W 4/12* (2013.01); *H04W 12/00503* (2019.01)

(58) Field of Classification Search
CPC ..... H04L 63/08; H04L 63/107; H04L 63/108; H04L 12/14; H04W 12/06; H04W 4/12; H04W 4/02; H04W 4/14; H04W 4/025; H04W 4/26; G07C 5/008; G07C 5/085; G07C 9/00126; G07C 9/00103; G07C 9/00119; G07C 9/00134; G07C 9/00571; G07C 1/00; G07C 9/00; G07C 9/00007; G07C 9/00174; G07C 9/00182; G07C 9/00309; G07C 9/02; G07C 11/00
See application file for complete search history.

(56) References Cited

U.S. PATENT DOCUMENTS

| | | |
|---|---|---|
| 2008/0039206 A1 | 2/2008 | Ackley et al. |
| 2008/0114841 A1 | 5/2008 | Lambert |
| 2011/0151842 A1 | 6/2011 | Olincy et al. |
| 2012/0200390 A1* | 8/2012 | Saravanan .......... G07C 9/00111 340/5.61 |
| 2012/0280783 A1* | 11/2012 | Gerhardt ............ G07C 9/00309 340/5.6 |

(Continued)

OTHER PUBLICATIONS

Chronotek (https://web.archive.org/web/20150206031158/http://www.chronotek.net:80/blog/), archived on Feb. 6, 2015 (Year: 2015).*

(Continued)

*Primary Examiner* — Daniel Lai

(57) ABSTRACT

Providing SMS check in and check out, comprising receiving an SMS mobile originated entrance communication from at least one user, authenticating the SMS mobile originated entrance communication, determining at least one location of the authenticated SMS mobile originated entrance communication and authorizing the at least one user to enter the at least one location.

20 Claims, 13 Drawing Sheets

(56) References Cited

U.S. PATENT DOCUMENTS

| | | | | |
|---|---|---|---|---|
| 2013/0008958 A1* | 1/2013 | Smith | ................ | G07C 9/00904 |
| | | | | 235/382 |
| 2014/0152422 A1* | 6/2014 | Breed | ................ | G06K 9/00369 |
| | | | | 340/5.52 |
| 2014/0333412 A1* | 11/2014 | Lewis | ................ | G07C 9/00031 |
| | | | | 340/5.2 |
| 2015/0348214 A1* | 12/2015 | Jain | ...................... | G06Q 40/125 |
| | | | | 705/14.58 |

OTHER PUBLICATIONS

HourDoc (http://www.hourdoc.com/node/64), dated Oct. 15, 2008 (Year: 2008).*

TSheets (https://web.archive.org/web/20150401015726/https://www.tsheets.com/text-message-nnobile-timesheet), archived on Apr. 1, 2015 (Year: 2015).*

\* cited by examiner

SMS CHECK IN AND CHECK OUT

CROSS-REFERENCE TO RELATED APPLICATIONS

The present patent application is a continuation of and claims priority from patent application Ser. No. 15/949,235, titled SMS CHECK IN AND CHECK OUT, filed Apr. 10, 2018, which is a continuation of and claims priority from patent application Ser. No. 14/829,917, titled SMS CHECK IN AND CHECK OUT, filed Aug. 19, 2015, now issued U.S. Pat. No. 9,942,734, the entire contents of each of which are enclosed by reference herein.

BACKGROUND

The present disclosure is generally related to short message system messages and more specifically to enable end users to check in and check out of locations via keyword combination text to an SMS short code.

Many workers including utility staff are now mobile in that they do not need to return to the shop in order to receive updated work orders for their next assignment. In fact, returning to the shop would in many cases result if vastly reduced productivity and efficiency. Due to the fact that work force dynamics have changed due to the electronic connectedness of our world, new means of tracking worker assignments, times and check in and check out of locations is sought after.

Therefore, what is needed is a means to enable workers to be able to check in and check out of facilities via an SMS text message.

SUMMARY

In one embodiment, a method, comprising at least one of, receiving an SMS mobile originated entrance communication from at least one user, authenticating the SMS mobile originated (MO) entrance communication, determining at least one location of the authenticated SMS MO entrance communication and authorizing the at least one user to enter the at least one location.

In another embodiment, a non-transitory computer readable medium comprising instructions that when read by a processor perform at least one of, receiving an SMS mobile originated entrance communication from at least one user, authenticating the SMS MO entrance communication, determining at least one location of the authenticated SMS MO entrance communication and authorizing the at least one user to enter the at least one location.

In a further embodiment, a system, comprising, a processor, wherein the processor performs at least one of, receives an SMS mobile originated entrance communication from at least one user, authenticates the SMS MO entrance communication, determines at least one location of the authenticated SMS MO entrance communication and authorizes the at least one user to enter the at least one location and a non-transitory memory communicably coupled to the processor, wherein the memory stores the authorization of the at least one user to enter the at least one location.

DETAILED DESCRIPTION

Figure 1:
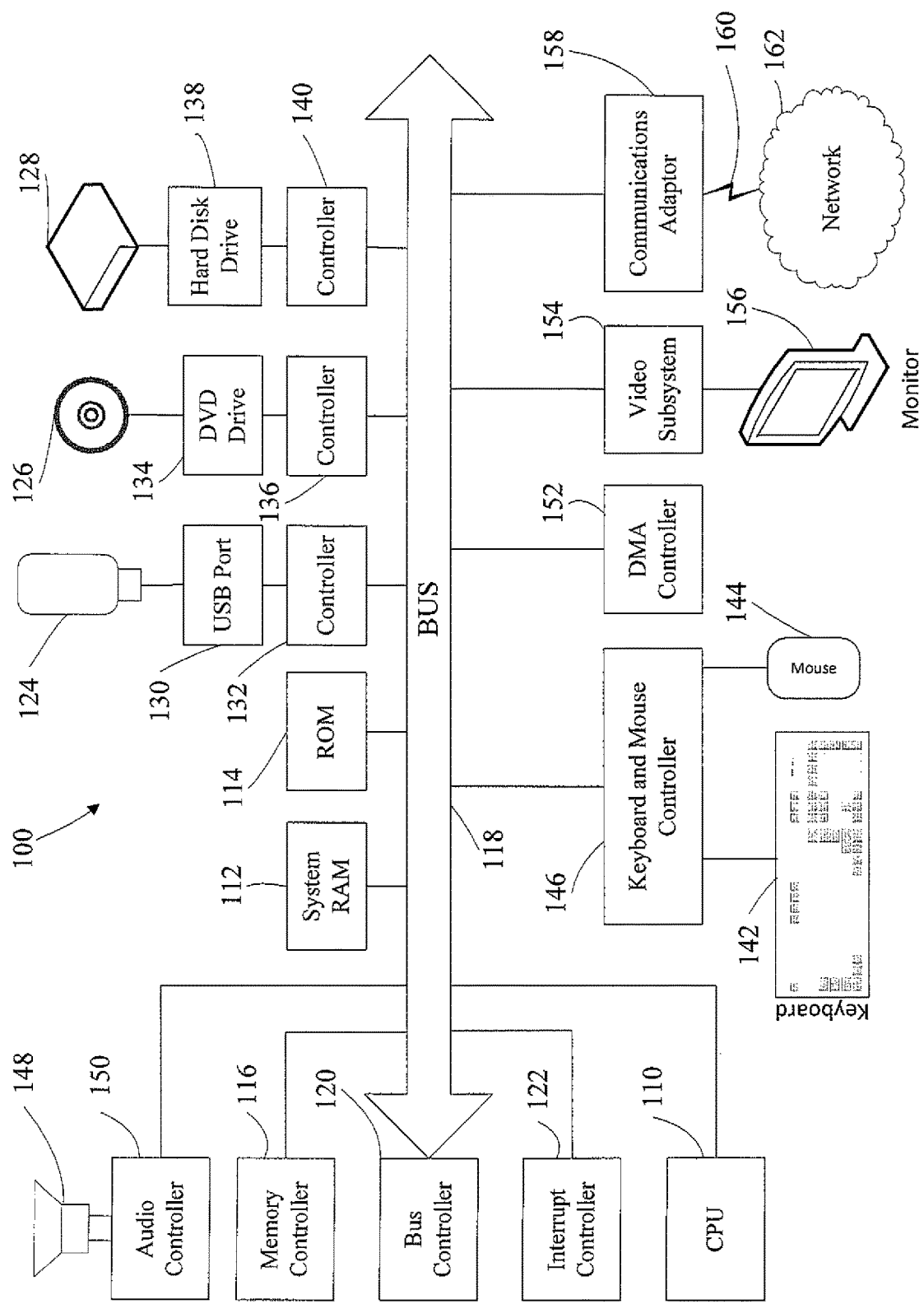
FIG. 1 depicts a first example system in accordance with one embodiment of the disclosure.

It may be readily understood that the components of the present application, as generally described and illustrated in the figures herein, may be arranged and designed in a wide variety of different configurations. Thus, the following detailed description of the examples of a method, apparatus, and system, as represented in the attached figures, is not intended to limit the scope of the application as claimed, but is merely representative of selected examples of the application.

The features, structures, or characteristics of the application described throughout this specification may be combined in a suitable manner in one or more examples. For example, the usage of the phrases example, examples, some examples, or other similar language, throughout this specification refers to the fact that a particular feature, structure, or characteristic described in connection with the example may be included in at least one example of the present application. Thus, appearances of the phrases example, examples, in some examples, in other examples, or other similar language, throughout this specification does not necessarily refer to the same group of examples, and the described features, structures, or characteristics may be combined in a suitable manner in one or more examples.

The disclosure discusses in part an application resident on a server. The device may be a computer, laptop, mobile, wireless or cellular phone, a PDA, a tablet, a client, a server or a device that contains a processor and/or memory, whether that processor or memory performs a function related to an example. The present application discussed throughout the disclosure may work with a device, such as a personal computer, a laptop, a personal computing tablet, a smartphone or a device with a processor and memory.

Definitions

SMS, Short Message Service ("SMS"), is a text messaging service component of phone, Web, or mobile communication systems. It uses standardized communications protocols to allow fixed line or mobile phone devices to exchange short text messages that are 160 characters in length and most commonly referred to as a text or txt.

MMS (Multimedia Messaging Service) is a protocol to send messages that include multimedia content to and from mobile phones. It extends the core SMS (Short Message Service) capability that allowed exchange of text messages only up to 160 characters in length.

Short Code, (also known as short numbers) are special telephone numbers, significantly shorter than full telephone numbers, that can be used to address SMS messages from certain service providers' mobile phones or fixed phones.

Keyword is a word or name used to distinguish a targeted message within a Short Code Service.

MO stands for mobile originated, which means the message that the customer sends in to the system, from their own mobile phone. When you send a message such as <SUBA> to short code 13114, this is a mobile initiated or originated, MO, communication.

MT stands for mobile terminated, which means the communication is terminated on the mobile phone. The message you receive back to the mobile phone such as "Entrance to the SUBA acknowledged", this is the mobile terminated message because it ends or terminates on the phone.

The disclosure discusses enabling utility staff to check in and check out of utility facilities via a text message. Utility staff may text the keyword "ENTER" and the abbreviation of the facility they are about to enter to the utility owned short code.

The application will confirm and validate the employee by their cell phone number using a hosted employee database and will confirm their intention to enter the facility. Once the staff member confirms, they will be placed on a checked in list and will be visible on a web based status display for administrators to monitor which facilities currently have staff checked in.

Administrators will be able to monitor the checked in and checked out status of staff members through the user interface and will also be able to set facilities as restricted so staff members are told they are not to enter the facility when they attempt to check in.

Computer System FIG. 1 illustrates the system architecture for an exemplary computer system 100 with which the current disclosure may be implemented. The exemplary computer system of FIG. 1 is for descriptive purposes. Although the description may refer to terms commonly used in describing particular computer systems, such as a personal computer, the description and concepts equally apply to other systems, including systems having architectures dissimilar to FIG. 1.

Computer system 100 typically includes a central processing unit (CPU) 110, which may be implemented with one or more microprocessors, a random access memory (RAM) 112 for temporary storage of information, and a read only memory (ROM) 114 for permanent storage of information. A memory controller 116 is provided for controlling RAM. A bus 118 interconnects the components of the computer system. A bus controller 120 is provided for controlling the bus. An interrupt controller 122 is used for receiving and processing various interrupt signals from the system components. Mass storage may be provided by flash 124, DVD 126, or hard disk 128, for example a solid-state drive. Data and software may be exchanged with the computer system via removable media such as the flash drive and DVD. The flash drive is insertable into a Universal Serial Bus, USB, drive 130, which is, in turn, connected to the bus by a controller 132. Similarly, the DVD is insertable into DVD drive 134, which is, in turn, connected to bus by controller 136. Hard disk is part of a fixed disk drive 138, which is connected to the bus by controller 140.

User input to the computer system may be provided by a number of devices. For example, a keyboard 142 and a mouse 144 are connected to the bus by a controller 146. An audio transducer 148, which may act as a microphone and a speaker, is connected to bus by audio controller 150, as illustrated. Other input devices, such as a pen and/or tabloid, may be connected to the bus and an appropriate controller and software. DMA controller 152 is provided for performing direct memory access to the system RAM.

A visual display is generated by video subsystem 154, which controls video display 156. The computer system also includes a communications adaptor 158, which allows the system to be interconnected to a local area network (LAN) or a wide area network (WAN) or other suitable network, schematically illustrated by a bus 160 and a network 162.

Figure 2:
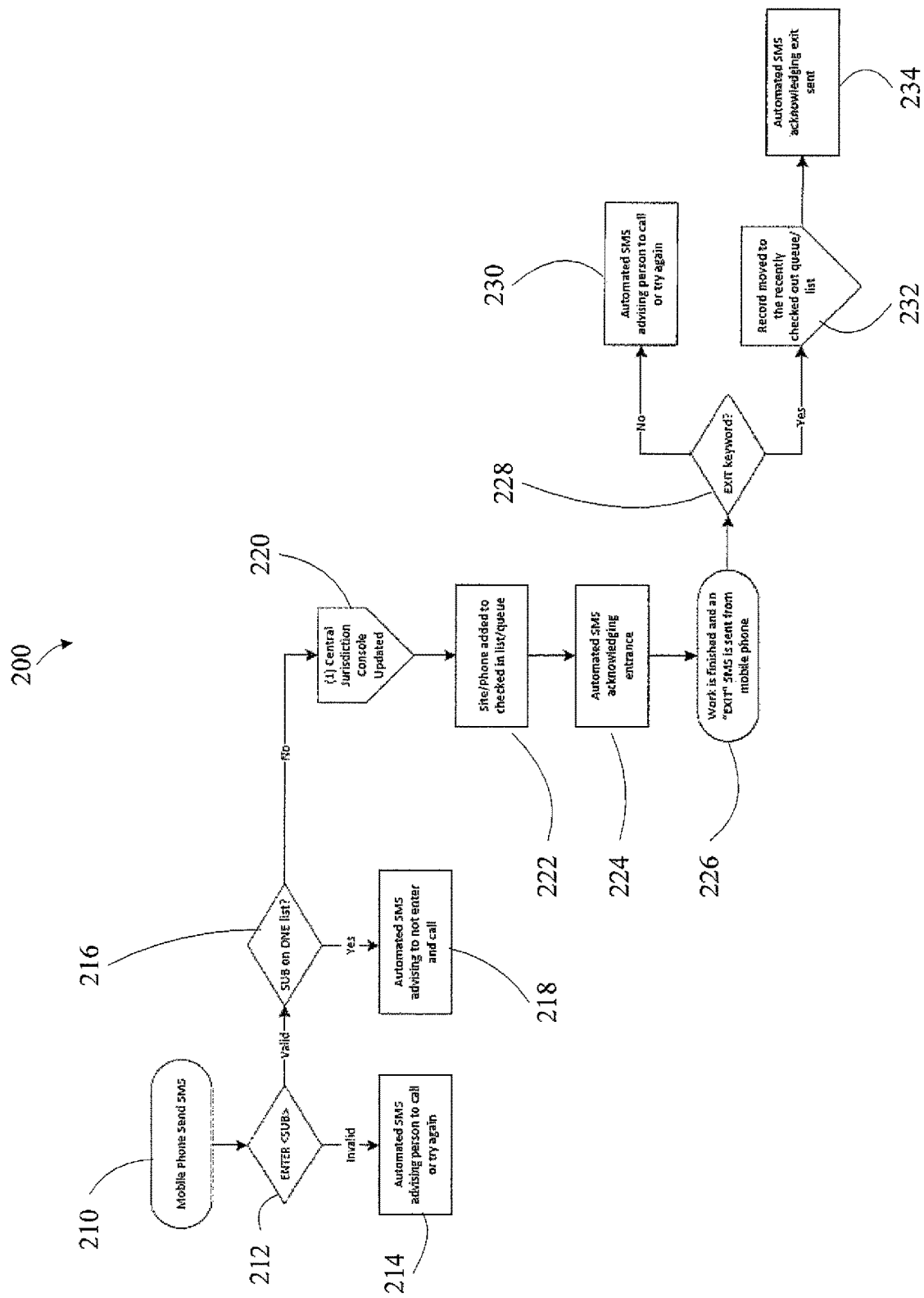
FIG. 2 depicts an example logic flow in accordance with one embodiment of the disclosure.

Referring now to FIG. 2, an example software flow 200 is shown. A mobile phone sends an SMS message 210. The SMS message is on an originating cell phone and is referred to as an MO (Mobile Originated) message. A keyword ENTER <SUB> 212 is entered in, this tells the receiver that an entry is requested at a particular substation. If either the keyword, or substation is invalid 214, an automated SMS message advises the user to call Jurisdiction Control or try again. If the keyword and location are valid the system determines whether the location is on a do not enter (DNE) list 216. If the location is on a DNE list, an automated SMS message is sent 218 advising the user not to enter and to call Jurisdiction Control. If the location is not on the do not enter list, a Jurisdiction Control console is updated 220 with the data associated with the user and location. The location and phone are added 222 to the checked in list. An automated SMS message is sent 224 to the phone acknowledging entrance to the location. After work is completed at the location an EXIT SMS message is sent 226 to the short code from the cell phone. The EXIT keyword is queried for in the SMS message 228, and if it is not found and automated SMS message is sent 230 advising the person to call Jurisdiction Control or try again. If the EXIT keyword is found a record is moved 232 to the recently checked out list and an acknowledging SMS exit message is sent 234 to the cell phone.

Figure 3:
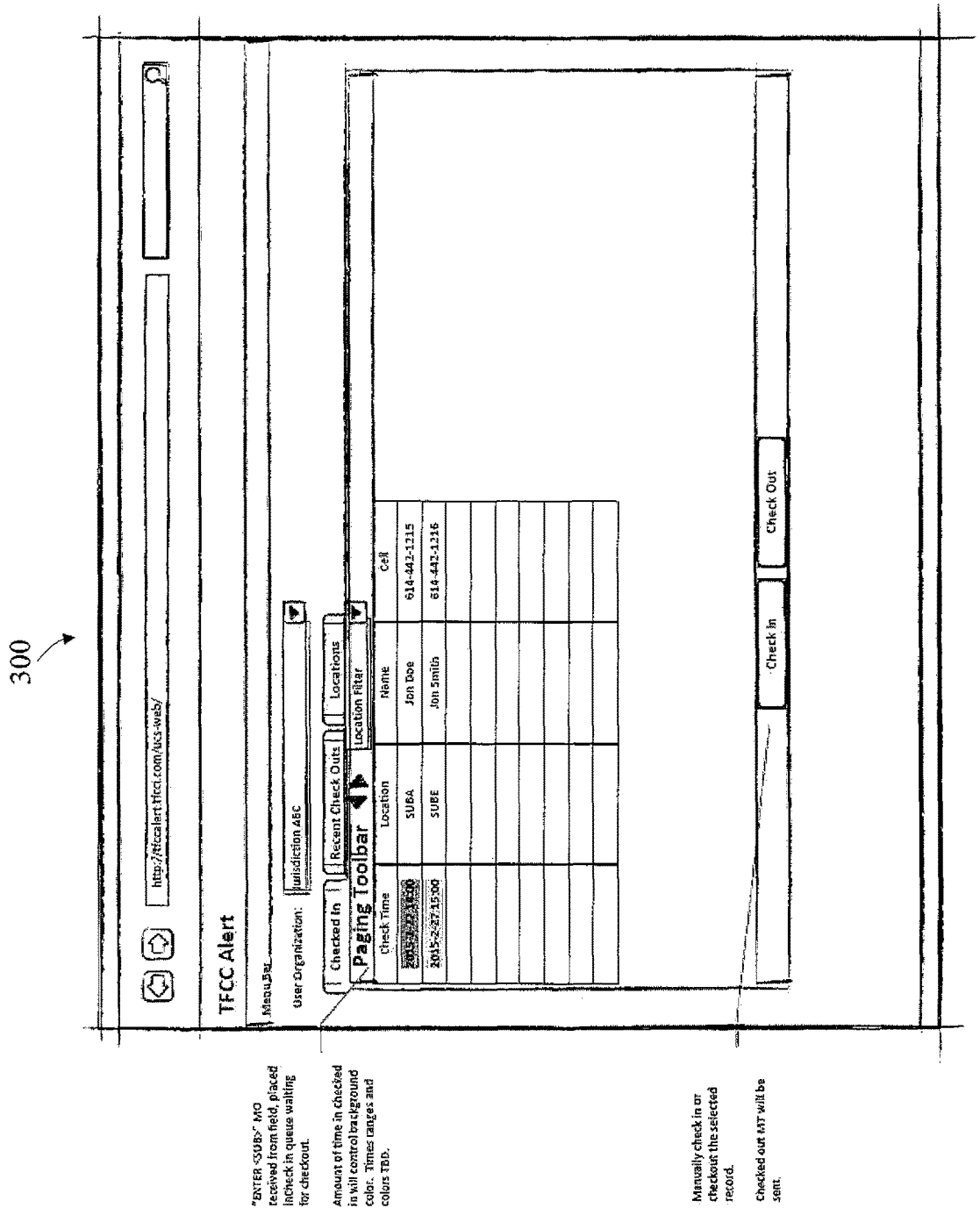
FIG. 3 depicts an example first screenshot in accordance with one embodiment of the disclosure.

Referring now to FIG. 3, a first screenshot is shown. An ENTER <SUB> message is sent from an MO. The user is then placed in a check in queue waiting for check out. The duration of the user at the location is measured and the user may be manually checked out. When check out occurs a mobile termination message (MT) will be sent.

Figure 4:
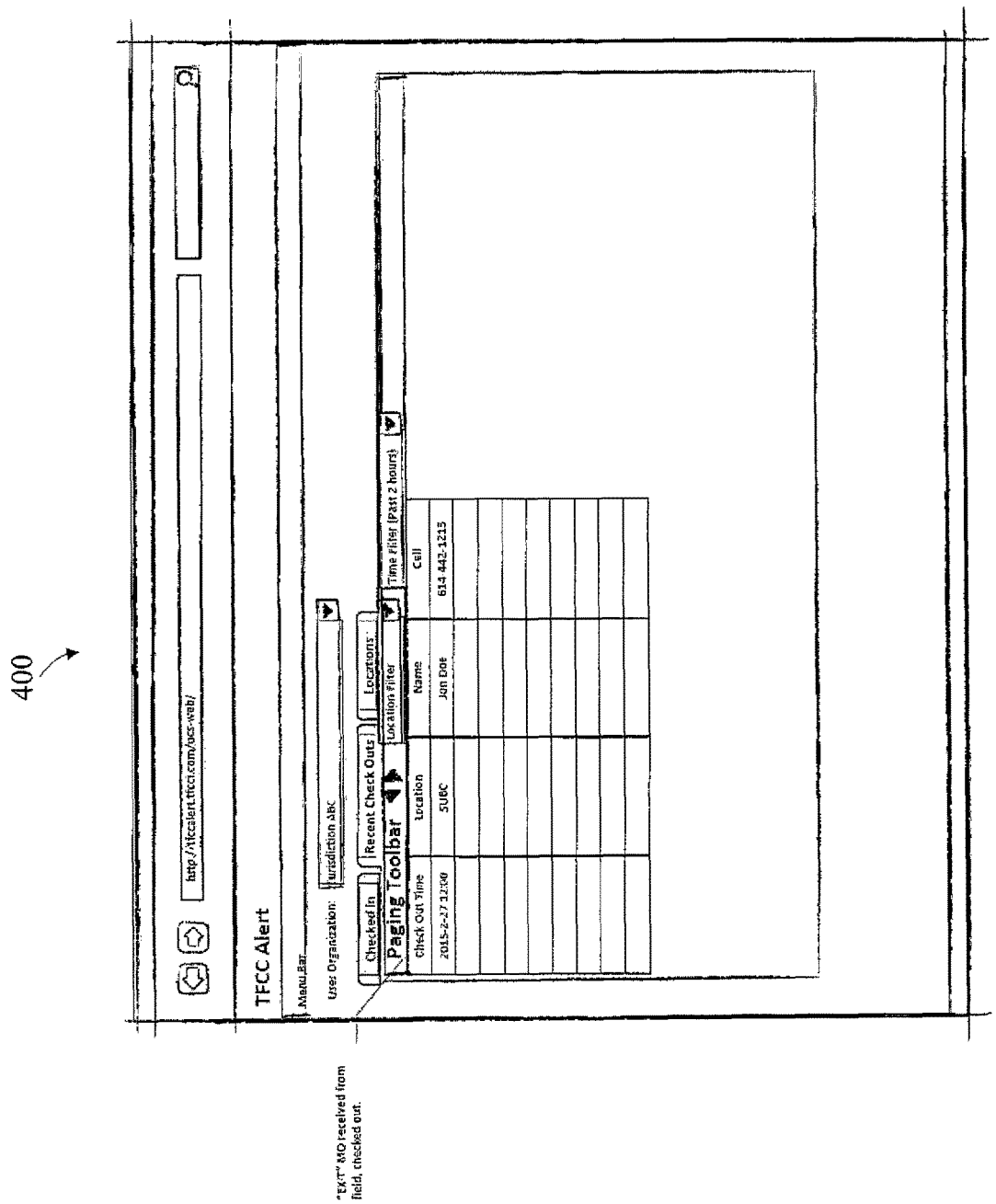
FIG. 4 depicts an example second screenshot in accordance with one embodiment of the disclosure.

Referring now to FIG. 4, a second screenshot is shown. In this screenshot the EXIT keyword is received from the mobile originating (MO) unit and the system checks out the user from the location.

Figure 5:
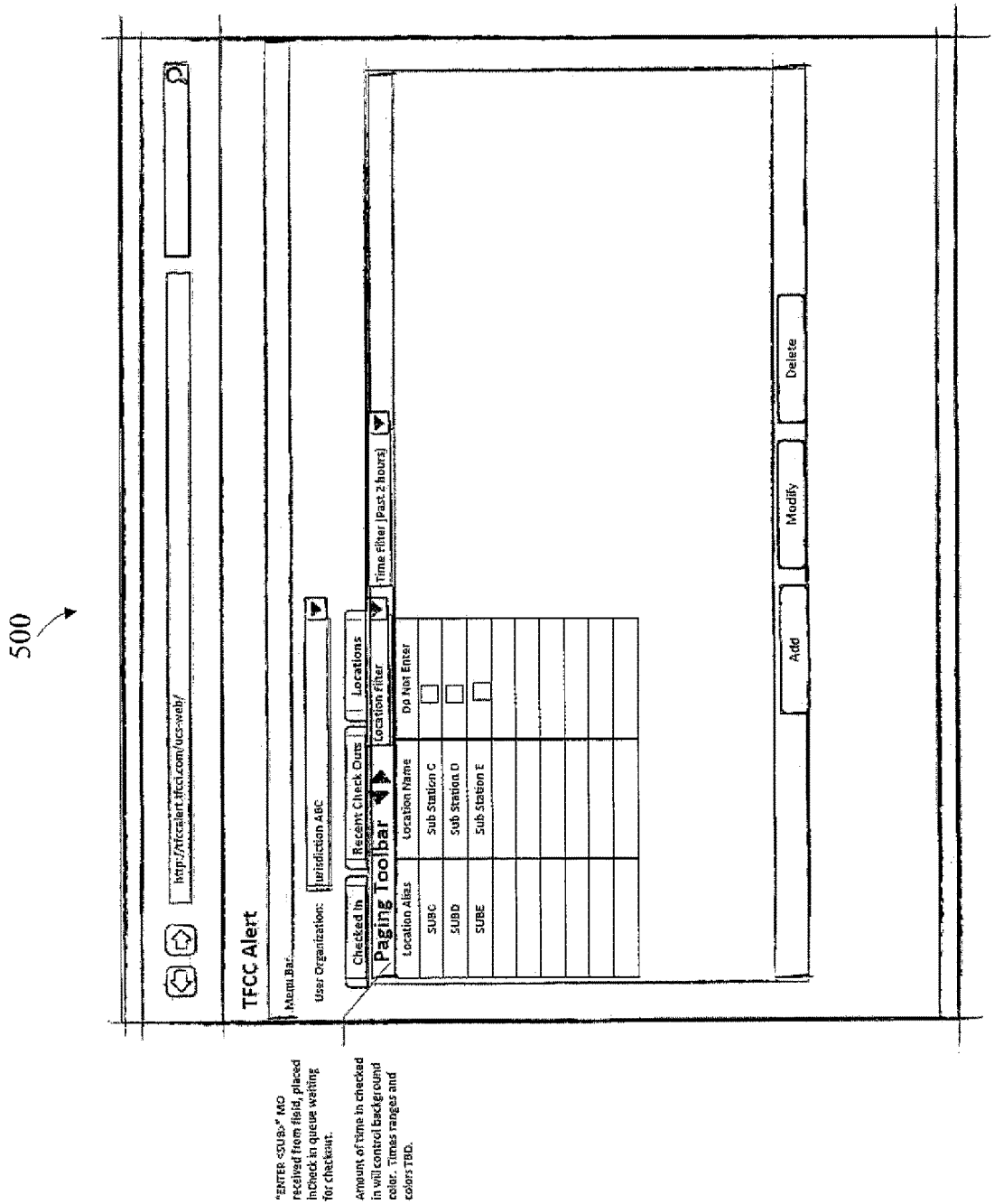
FIG. 5 depicts an example third screenshot in accordance with one embodiment of the disclosure.

Referring now to FIG. 5, a third screenshot is shown. In this screenshot the Jurisdiction Control panel is shown. The ENTER keyword and <SUB> location are recorded and a determination is made whether the user may enter the location. In this case if the do not enter box is checked, the user is precluded from entering the requested location.

Figure 6:
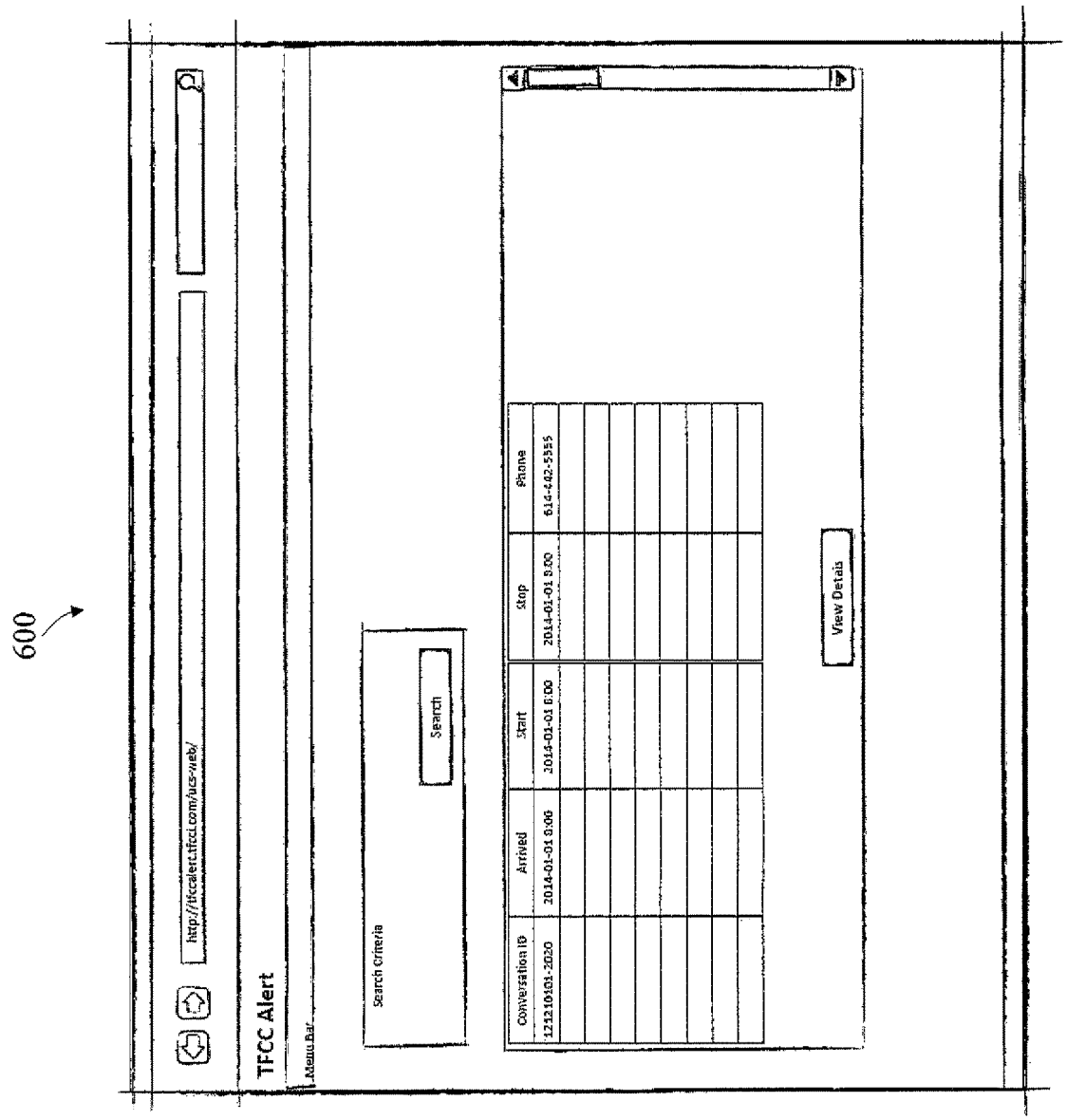
FIG. 6 depicts an example fourth screenshot in accordance with one embodiment of the disclosure.

Referring now to FIG. 6, a fourth screenshot is shown. In this example a record is kept of the SMS communications, the arrival, work and exit times according to the SMS communications received.

Figure 7:
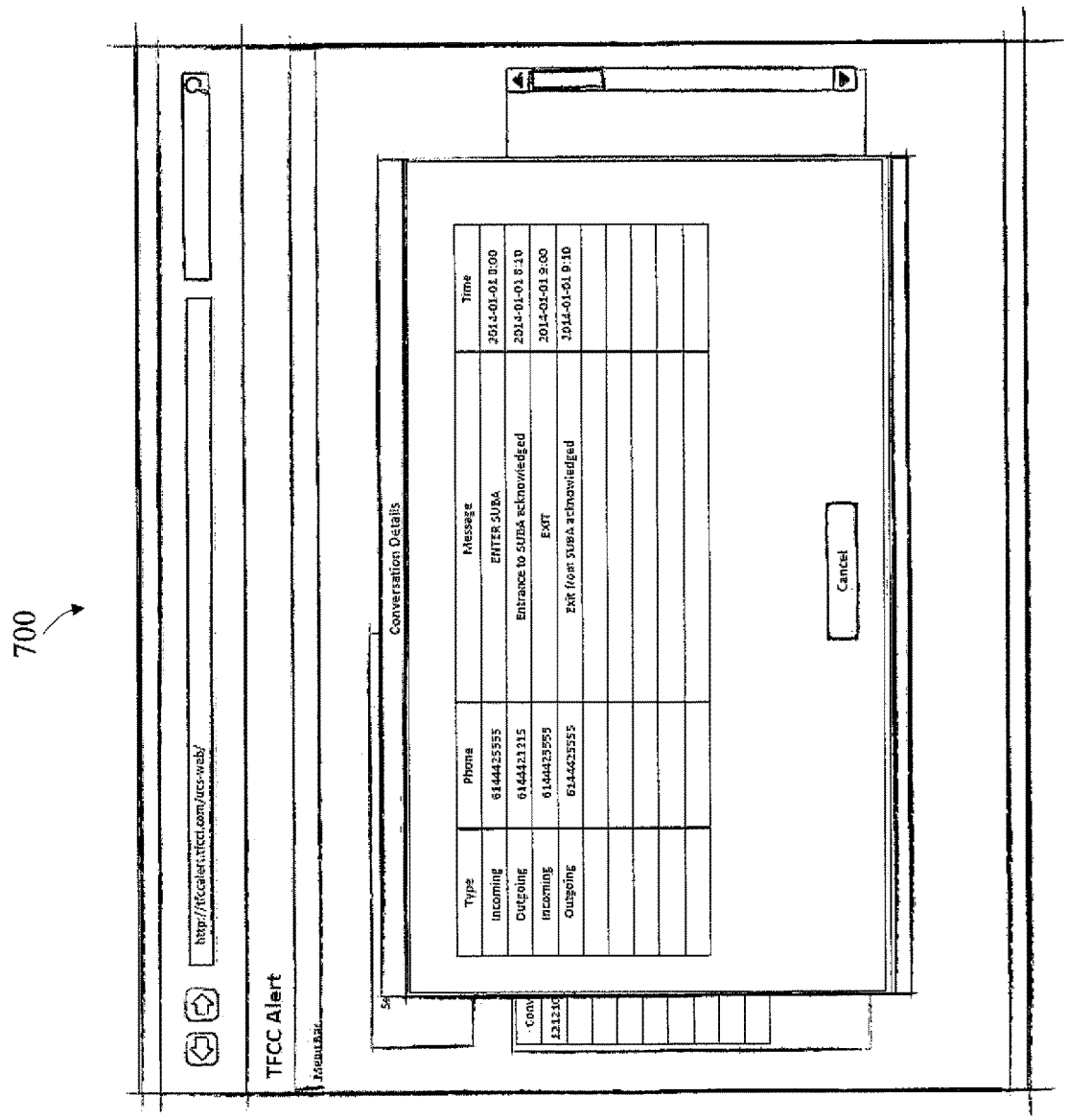
FIG. 7 depicts an example fifth screenshot in accordance with one embodiment of the disclosure.

Referring now to FIG. 7, a fifth screenshot is shown. In this example a second SMS communications log is kept which indicates whether the SMS communication is incoming or outgoing, which cell phone it is from, the message itself and the time log of the message.

Figure 8:
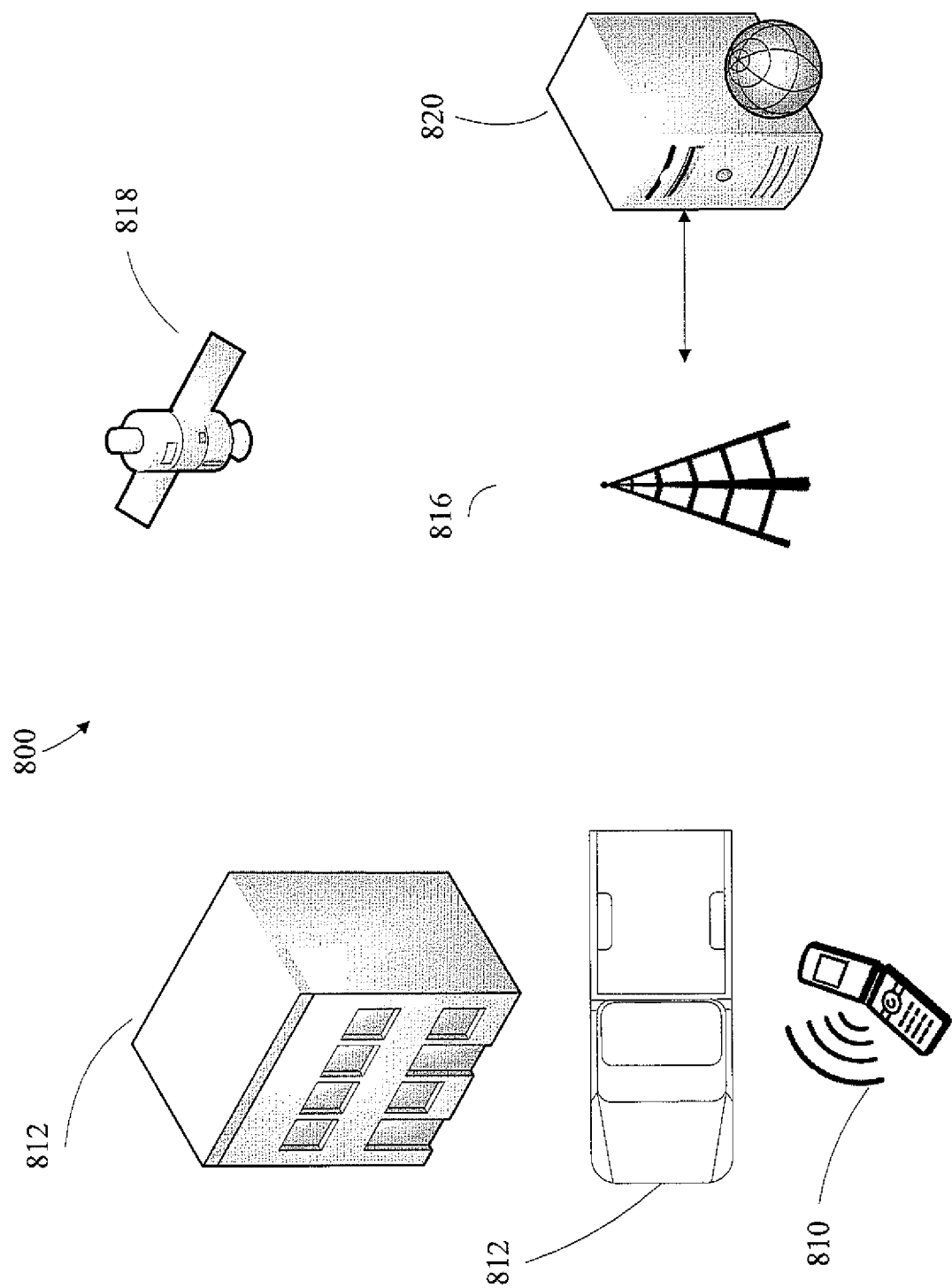
FIG. 8 depicts a second example system having one user and one location in accordance with one embodiment of the disclosure.

In FIG. 8 a second overall system is depicted 800. In this example a user sends an SMS message by cell phone 810 from his truck 812 when he is nearing a work location 814. The cellular signal is picked up by a cell tower 816 and sent to a Central Jurisdiction server 820. Embedded within the SMS message is a location signal based on GPS 818. The user and location are reviewed to authenticate the SMS MO entrance communication and to authorize the user to enter the location.

Figure 9:
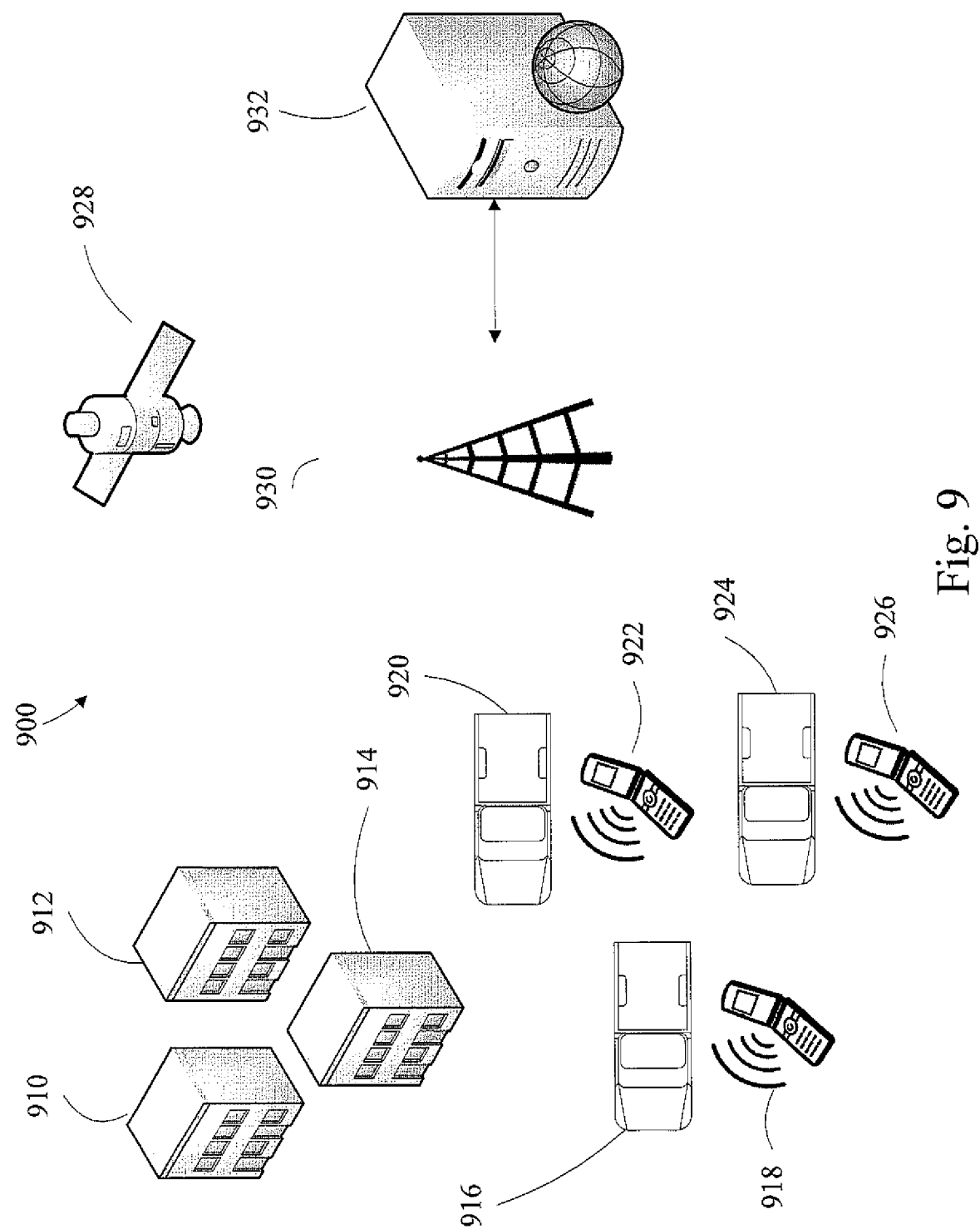
FIG. 9 depicts a third example system having multiple users and multiple locations in accordance with one embodiment of the disclosure.

The third system example shown in FIG. 9 includes a set of work locations 910, 912 and 914 are to be serviced by a group of workers 918, 922 and 926 each in their respective work vehicles 916, 920 and 924. The location of the users is determined by GPS 928 coordinates embedded in SMS MO signals sent by cellular signal 930 to the Central Jurisdiction server 932. Determinations are made as to whether the users may enter the various locations, and data for entrance, duration of call and exit are kept at the central jurisdiction server.

Figure 10:
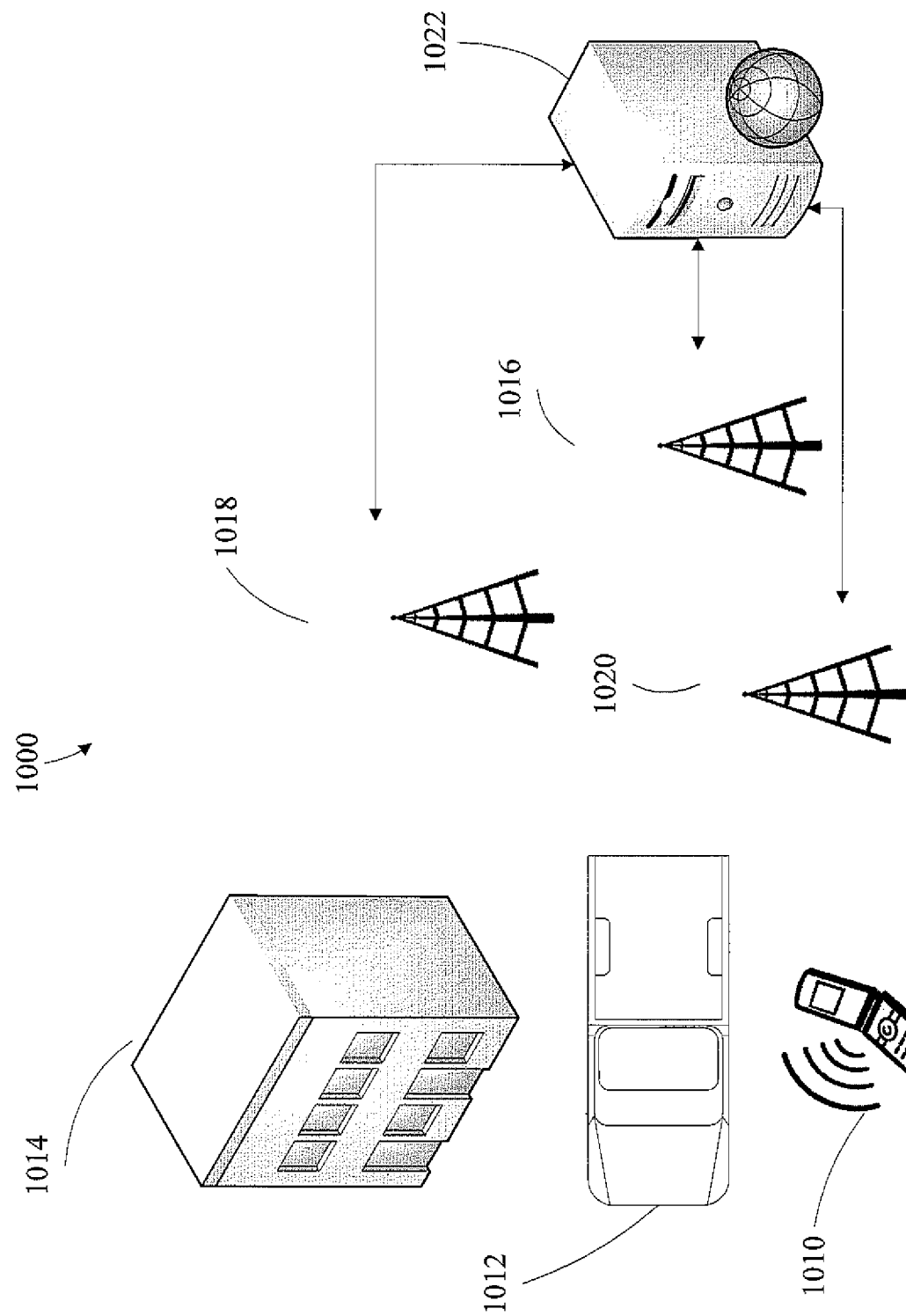
FIG. 10 depicts a fourth example system having utilizing multiple cell towers to determine location in accordance with one embodiment of the disclosure.

A fourth example system is depicted in FIG. 10. In this example a cell phone 1010 in a work vehicle 1012 without GPS is communicating by SMS messaging to check in to a work location 1014. The signal from the cell phone is measured by multiple cell towers 1016, 1018 and 1020 which measure the angle of communication, the timing of the signals and the strength of the signals to triangulate a position by the Jurisdictional Control server 1022. This triangulated position servers as a double check to the claim by the user of being at the location. The Jurisdictional Control server may also utilize the SMS message beginning time to authenticate the user at the location. In essence, if the user is there at a different day or time than originally planned, the system may disallow an entry.

Figure 11:
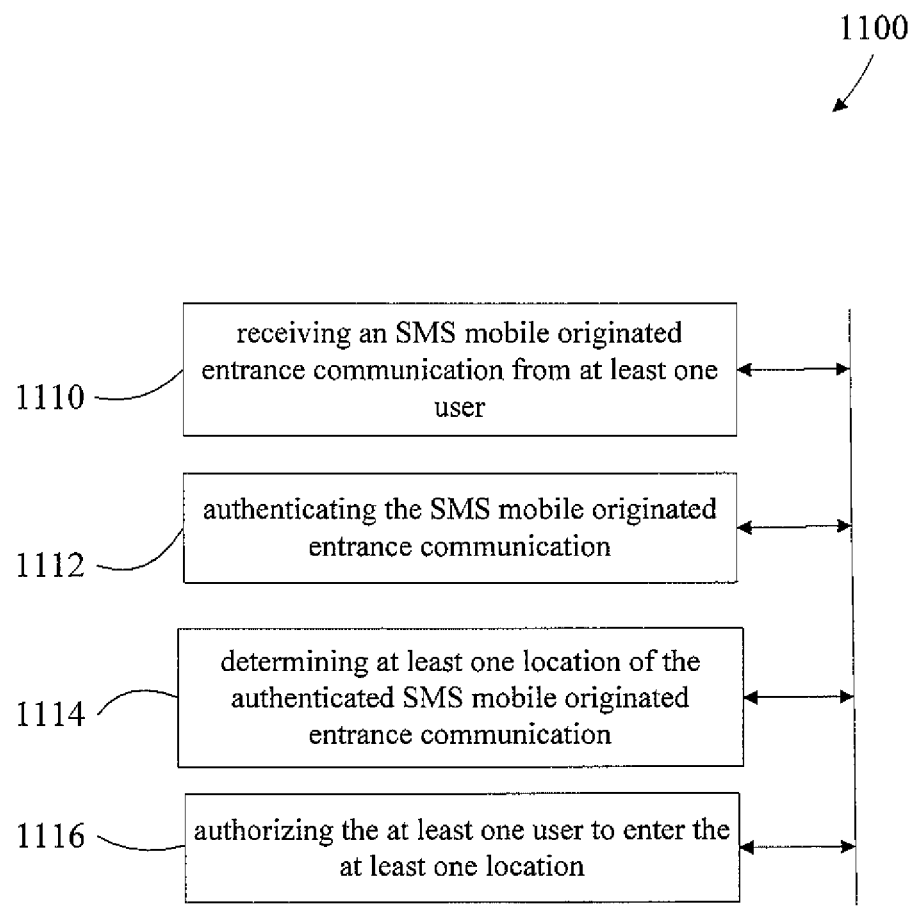
FIG. 11 depicts an example method in accordance with one embodiment of the disclosure.

FIG. 11 depicts a method comprising, receiving 1110 an SMS mobile originated entrance communication from at least one user, authenticating 1112 the SMS mobile originated entrance communication, determining 1114 at least one location of the authenticated SMS mobile originated entrance communication and authorizing 1116 the at least one user to enter the at least one location.

The method may also comprise the steps of logging an entry time of the at least one user to the at least one location, updating a checked in status with data associated with the at least one user at the at least one location, logging an exit time of the at least one user from the at least one location and updating a central jurisdiction console with data associated with the at least one user at the at least one location. Wherein the location may be determined based on GPS data embedded within the SMS mobile originated entrance communication, and/or based on an angle of transmission, time of communication delay to multiple cell phone towers and strength of signal to multiple cell phone towers. The authorization may be based upon a pre-scheduled entrance time, the at least one user is for a group of users and the at least one user to enter the at least one location is for a group of locations.

Figure 12:
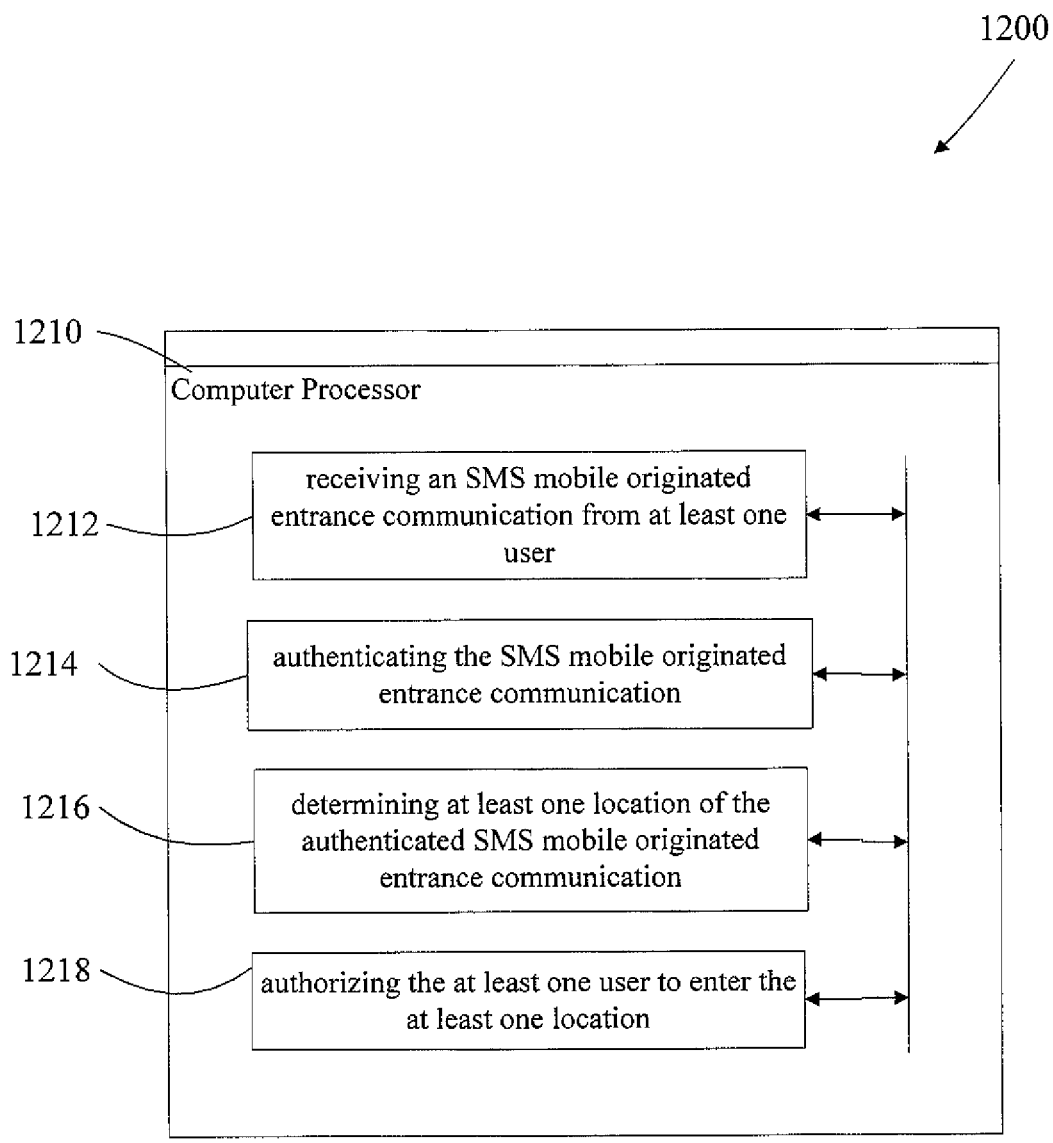
FIG. 12 depicts an example non-transitory computer readable medium in accordance with one embodiment of the disclosure.

FIG. 12 depicts a non-transitory computer readable medium comprising instructions that when read by a processor 1210 performs receiving 1212 an SMS mobile originated entrance communication from at least one user, authenticating 1214 the SMS mobile originated entrance communication, determining 1216 at least one location of the authenticated SMS mobile originated entrance communication and authorizing 1218 the at least one user to enter the at least one location.

The non-transitory computer readable medium may also comprise the steps of logging an entry time of the at least one user to the at least one location, updating a checked in status with data associated with the at least one user at the at least one location, logging an exit time of the at least one user from the at least one location and updating a central jurisdiction console with data associated with the at least one user at the at least one location.

Figure 13:
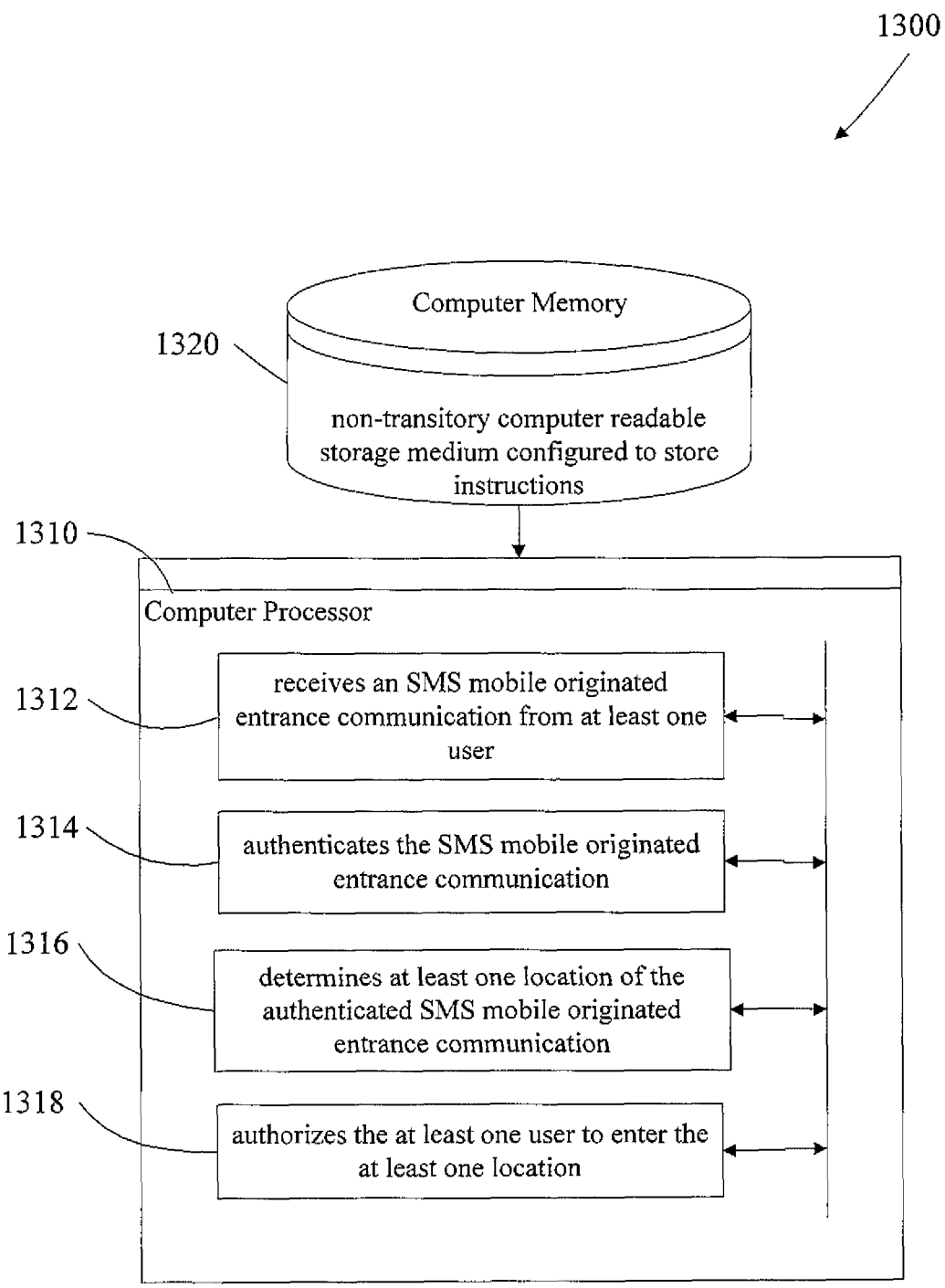
FIG. 13 depicts a fifth example system in accordance with one embodiment of the disclosure.

FIG. 13 depicts a fifth example system 1300, comprising a processor 1310, wherein the processor receives 1312 an SMS mobile originated entrance communication from at least one user, authenticates 1314 the SMS mobile originated entrance communication, determines 1316 at least one location of the authenticated SMS mobile originated entrance communication and authorizes 1318 the at least one user to enter the at least one location and a non-transitory memory 1320 communicably coupled to the processor, wherein the memory stores the authorization of the at least one user to enter the at least one location.

The system may also have the processing instructions comprise the steps of having the processor log an entry time of the at least one user to the at least one location, update a checked in status with data associated with the at least one user at the at least one location, log an exit time of the at least one user from the at least one location and update a central jurisdiction console with data associated with the at least one user at the at least one location.

Those skilled in the art will understand that the format, layout, and content of the data structure as shown in the figures is illustrative rather than limiting of the instant invention. Specifically, those skilled in the art will recognize that various changes, modifications, additions, omissions, or alterations may be made to the data structure shown without departing from the scope of the instant invention as recited in the claims appended hereto. More particularly, other types of computing devices both mobile and those which provide a server function may be utilized.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example a network element, this may represent any of the above-described network components, etc.

Although an exemplary example of at least one of the system, method, and non-transitory computer readable medium of the present disclosure has been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture.

The above examples are for illustrative purposes and are not intended to limit the scope of the disclosure or the adaptation of the features described herein to particular components. Those skilled in the art will also appreciate that various adaptations and modifications of the above-described preferred examples can be configured without departing from the scope and spirit of the disclosure. Therefore, it is to be understood that, within the scope of the appended claims, the disclosure may be practiced by examples in addition to those specifically described.

What is claimed is:

1. A method, comprising:
   receiving, at a server location, a plurality of SMS mobile originated entrance communications from a plurality of respective users;
   authorizing each user associated with each of the authenticated SMS mobile originated entrance communications to enter an associated physical facility;
   receiving an exit message from each user, wherein when the exit message is invalid, sending an automated SMS message advising the respective user to make another attempt and when the exit message is valid, sending an acknowledging SMS exit message to the respective user;
   determining a time duration that each user spent at the associated facility; and
   transmitting a mobile terminated message to each user.

2. The method of claim 1 wherein the authorizing is based upon a pre-scheduled entrance time.

3. The method of claim 1 further comprising logging an entry time of the user to the associated physical facility.

4. The method of claim 1 further comprising updating a checked in status with data associated with the user at the associated physical facility.

5. The method of claim 1 further comprising logging an exit time of the user from the associated physical facility.

6. The method of claim 1 further comprising updating a central jurisdiction console with data associated with the user at the associated physical facility.

7. The method of claim 6 wherein a geographic location is determined based on GPS data embedded within the SMS mobile originated entrance communication.

8. The method of claim 1 wherein a geographic location is determined based on an angle of transmission, time of communication delay to multiple cell phone towers and strength of signal to multiple cell phone towers.

9. The method of claim 1 wherein the authorizing each user is for a group of users.

10. The method of claim 1 wherein the authorizing each user to enter the associated physical facility includes authorization for a plurality of physical facilities.

11. A non-transitory computer readable medium comprising instructions that when read by a processor perform:
   receiving, at a server location, a plurality of SMS mobile originated entrance communications from a plurality of respective users;
   authorizing each user associated with each of the authenticated SMS mobile originated entrance communications to enter an associated physical facility;
   receiving an exit message from each user, wherein when the exit message is invalid, sending an automated SMS message advising the respective user to make another attempt and when the exit message is valid, sending an acknowledging SMS exit message to the respective user;
   determining a time duration that each user spent at the associated facility; and
   transmitting a mobile terminated message to each user.

12. The computer readable medium of claim 11 comprising instructions for logging an entry time of the user to the associated physical facility.

13. The computer readable medium of claim 11 comprising instructions for updating a checked in status with data associated with the user at the associated physical facility.

14. The computer readable medium of claim 11 comprising instructions for logging an exit time of the user from the associated physical facility.

15. The computer readable medium of claim 11 comprising instructions for updating a central jurisdiction console with data associated with the user at the associated physical facility.

16. A system, comprising:
   a processor, wherein the processor,
   receives, at a server location, a plurality of SMS mobile originated entrance communications from a plurality of respective users;
   authorizes each user associated with each of the authenticated SMS mobile originated entrance communications to enter an associated physical facility;
   receives an exit message from each user, wherein when the exit message is invalid, sending an automated SMS message advising the respective user to make another attempt and when the exit message is valid, sending an acknowledging SMS exit message to the respective user;
   determines a time duration that each user spent at the associated facility; and
   transmits a mobile terminated message to each user.

17. The system of claim 16 wherein the processor logs an entry time of the user to the associated physical facility.

18. The system of claim 16 wherein the processor updates a checked in status with data associated with the user at the associated physical facility.

19. The system of claim 16 wherein the processor, logs an exit time of the user from the associated physical location.

20. The system of claim 16 wherein the processor, updates a central jurisdiction console with data associated with the user at the associated physical location.

* * * * *